United States Patent [19]

Swartz

[11] Patent Number: 5,151,149

[45] Date of Patent: Sep. 29, 1992

[54] APPARATUS FOR BONDING OR MELT FUSING PLASTIC AND PLASTIC MATRIX COMPOSITE MATERIALS

[75] Inventor: Henry D. Swartz, Newton, Mass.

[73] Assignee: The Entwistle Corporation, Hudson, Mass.

[21] Appl. No.: 759,055

[22] Filed: Sep. 5, 1991

Related U.S. Application Data

[63] Continuation of Ser. No. 329,323, Mar. 27, 1989, abandoned, which is a continuation-in-part of Ser. No. 225,296, Jul. 28, 1988, abandoned.

[51] Int. Cl.⁵ ............................................. B27G 11/02
[52] U.S. Cl. ............................. 156/379.8; 156/380.9; 156/499; 156/580; 156/308.4; 156/309.9; 156/272.8
[58] Field of Search ............... 156/272.2, 275.1, 273.3, 156/272.8, 380.9, 308.4, 309.6, 309.9, 499, 82, 379.8, 580; 219/348, 347, 349, 405, 411, 35; 901/16, 41

[56] References Cited

U.S. PATENT DOCUMENTS

| | | | |
|---|---|---|---|
| 3,883,369 | 5/1975 | Badger et al. | 156/272.2 X |
| 4,029,535 | 6/1977 | Cannon et al. | 156/275.1 X |
| 4,061,519 | 12/1977 | Hammer | 156/244.17 |
| 4,156,626 | 5/1979 | Souder | 156/275.1 X |
| 4,447,402 | 5/1984 | Cox | 219/404 X |
| 4,515,651 | 5/1985 | MacLaughlin et al. | 156/380.9 X |
| 4,543,033 | 9/1985 | Czermak et al. | 901/16 X |
| 4,581,520 | 4/1986 | Vu et al. | 219/411 X |
| 4,695,705 | 9/1987 | Kulig | 219/411 X |

FOREIGN PATENT DOCUMENTS 938499 2/1956 Fed. Rep. of Germany.
260146 7/1949 Switzerland.

OTHER PUBLICATIONS

"Laser Beam Welding", *Metals Handbook*, 1983: vol. 6, pp. 655-657.
Thomas Register Catalog File, Showing Research, Inc., p. 9417, Copyright 1991.

*Primary Examiner*—David A. Simmons
*Assistant Examiner*—Chester T. Barry
*Attorney, Agent, or Firm*—Polster, Lieder, Woodruff & Lucchesi

[57] ABSTRACT

Joining of thermoplastic parts (2, 4) of indeterminate thickness to each other is effected by application of heat to selected surface areas thereof (42, 44) by intense focussed infrared heat lines produced by parabolic-elliptical-reflection heat sources (22, 24) displaced by a reciprocating linear actuator (26), removable by a robotic controller (36) after completion of heating to enable immediate pushing together of the parts by further actuators (32, 34) for bonding.

3 Claims, 5 Drawing Sheets

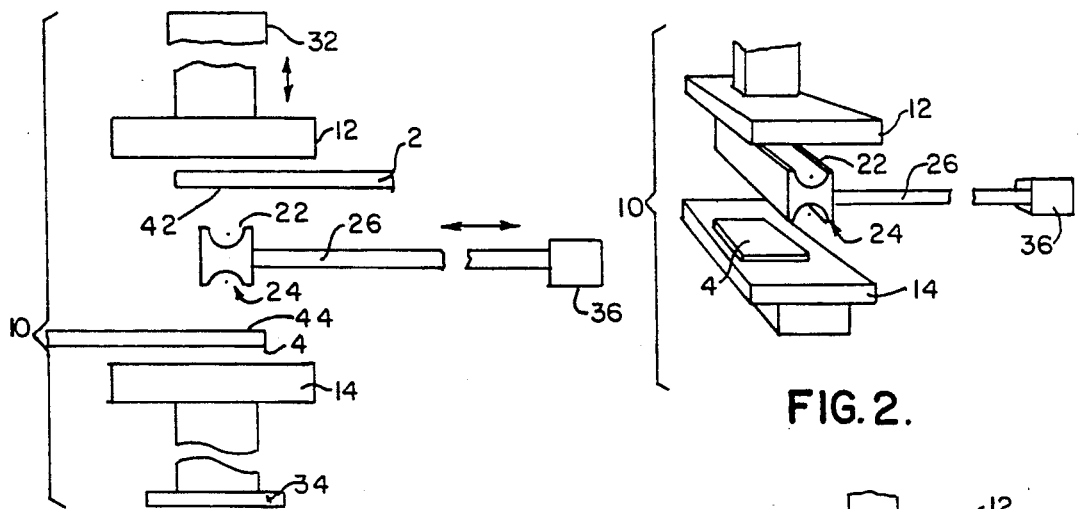
FIG. 1.
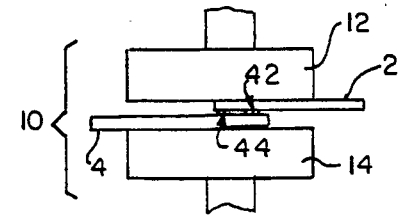
FIG. 2.
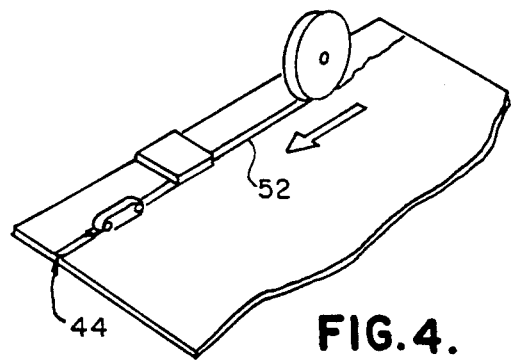
FIG. 4.
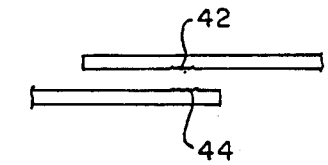
FIG. 3.
FIG. 6.
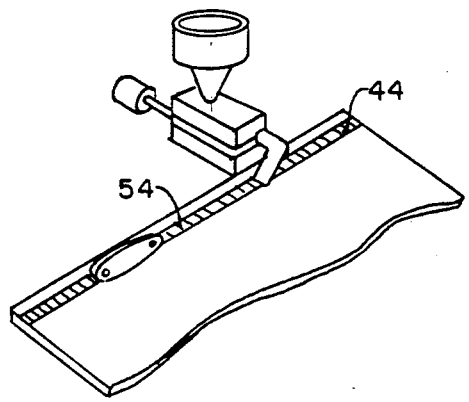
FIG. 5.
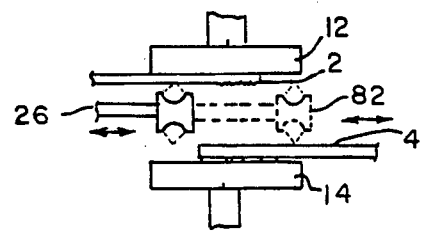
FIG. 7.

APPARATUS FOR BONDING OR MELT FUSING PLASTIC AND PLASTIC MATRIX COMPOSITE MATERIALS

CROSS REFERENCE TO RELATED APPLICATION

This is a continuation of application Ser. No. 07/329,323, filed Mar. 27, 1989, now abandoned, which is a continuation-in-part of U.S. Ser. No. 225,296, filed Jul. 28, 1988, now abandoned.

FIELD OF INVENTION

The present invention relates to methods and apparatus for the fuse melting or bonding of plastic materials and plastic matrix composite materials.

BACKGROUND OF THE INVENTION

A composite is a resin or resin-like crystalline, amorphous or semi-crystalline matrix in which is embedded wires, fibers, whiskers or flakes typically of carbon, graphite, fiberglass or boron. Reinforcing materials can be long, short, layered, chopped, orderly or random. Typically, layers composed of parallel fibers are oriented and laminated in different directions to produce a stress-free, lightweight, uniform sheet of unusual strength.

Reinforced polymer composites can maintain material strength and integrity at continuous source temperatures typically at 400° F. and higher and have substantial usage in the fields of aircraft, automotive structures, construction materials, machine parts and a variety of consumer product constructions as a replacement for metal and wood.

A major problem which has plaqued the plastic and plastic matrix composite industry is the lack of appropriate technology for joining of these composites. Present state-of-the art bonding methods are unsatisfactory; these include adhesives, resistance welding, ultrasonic bonding, vibration welding, induction bonding, high frequency welding, mechanical fasteners and infrared radiant heat. Each method has inherent problems which this invention overcomes.

Adhesives are difficult to apply uniformly and, because of the difference in composition and lack of molecular continuity, create fracture lines.

Resistance welding requires conductive metal or carbon strips that remain in the joint after the resistance current is applied. This weakens the bond by producing a discontinuity in the integrity of the plastic.

Ultrasonic bonding is effective only in layers less than 0.040" and is suitable for short bonding lines of under 10" in length. The high frequency vibrating of the material inherent in the ultrasonic bonding process dislocates and abrades the fiber structure of the composite material resulting in a weakening of the material.

Vibrational bonding requires the rapid frictional abrading of the two surfaces to be bonded which disrupts the fibers imbedded in the matrix.

Induction bonding requires the use of ferrous metal powders which are left in the joint area of the interface of the two parts being bonded thus disrupting the integrity of the composite plastic material and requiring under bond lines to accomplish the joining.

High frequency welding results in a weak bond and thinning of the material at the joint because the materials typically used in the thermoplastic matrix are dielectrically resistant to high frequency current. If the reinforcing fibers are dielectrically conductive, then transfer of heat to the interior of the composite material results in overheating, melting, thinning and weakening.

Mechanical fasteners are unsatisfactory because the integrity of the composite sheet is interrupted by the puncture necessary to affix the fasteners. Mechanical joints often leak and create a weakness of the joints.

Infrared and laser heating prior to the present invention has been unsuccessful because the electromagnetic energy is absorbed and dissipated by the material surface. The bonding surface, when exposed to unfocussed radiant energy, melts, deforms and weakens. When removed from the heat the material cools before it can be brought together. One of the novel features of the present invention is the intermittent application of a narrow line, point or series of points of focussed infrared heat at the bonding interface of each sheet or part. It is the periodicity of the intense heat which resolves the problems previously inherent in infrared and laser heating. In accordance with the method and apparatus of the present invention, means are provided to effect such periodicity and to hold the parts apart while heat is applied to the bonding surfaces and to quickly join the parts after heating before cool down.

It is an object of the invention to provide a guick and effective method of bonding plastic matrix composites and melt fusing monolithic thermoplastics and elastomers which overcomes virtually all of the problems inherent in present state-of-the-art bonding processes and results in bonds and fusions which consistently test in excess of 2,000 psi in lap shear, 1,000 psi or more in flat pull strength, and over 5 lbs in peel.

It is a further object of this invention to provide a uniform bond which avoids the discontinuity introduced by adhesives; avoids the vibration and tearing inherent in ultrasonic bonding; avoids the ferrous residue inherent to induction bonding; avoids the thinning and weakening produced by high frequency welding; solves the problem of material puncture which is a problem with mechanical fastening; and eliminates the installation of high resistance wire that remains in the seam during resistance welding.

It is an object of this invention to provide a strong, stress-free bond of any geometric configuration.

It is an object of this invention to provide a leak-proof homogenous bond line without any reduction of the composite sheet's or part's thickness by means of molecular bonding within the resin of the joined thermoplastic composites such that the bond is as strong as the resin itself.

It is a further object of this invention to provide a method of bringing together the surfaces to be bonded immediately on the cessation of heating which result in bond strengths up to and in excess of 2000 psi in lap shear on a 1"×1" bond line, and over 1,000 psi in a flat tensile pull, and more than 5 lbs. in a test peel on the same 1"×1" bond specimen.

It is a further object of this invention to provide noncontact heating of bond line material without reducing the thickness of the pre-joined sheets or parts in substantially reduced times of approximately 30 seconds to 10 minutes.

It is a further object of this invention to provide intermittent focused radiant heat means to both surfaces to be bonded prior to bonding and to provide heat means to the enriching matrix prior to bonding whereby only the outermost layers of the designated bonding areas on surfaces to be bonded are heated, leaving the internal temperature and fiber structure of the material essentially unaffected, and leaving the adjacent surface material unheated.

SUMMARY OF THE INVENTION

According to the invention, intermittent focussed infrared radiant energy is focussed simultaneously on the designated bonding areas on surfaces of multiple parts to be joined. A bonding agent consisting of a "nest" layer (i.e., essentially free of reinforcement or other foreign infusion) of the matrix material may be applied to one or both designated areas of the surfaces to be bonded. The surfaces are then brought into immediate bonding contact with sufficient pressure to accomplish the bonding without distorting the material.

The steps to accomplish the bonding are as follows:

Step One: Abrade or clean (e.g. with solvent) the bonding areas to be jointed (optional) and/or enrich the bonding areas with a "neat" layer of thermoplastic resin, compatible with the matrix of each part.

Step Two: Apply with heat a pellet of neat resin or an extruded monolithic tape of neat resin to the bond line of one or both bonding surface areas of each interface of the material to be bonded. (Alternatively, the resin tape may contain dispersed fibers or other reinforcement in some embodiments.)

Step Three: Heat the tape (if any) and bonding area quickly without heating the inner layers of the plastic matrix material.

Step Four: As soon as the upper and lower interfaces and bonding tapes or pellets have been softened sufficiently to be reformed as a single fusion, the press is brought together quickly. A mechanical stop prevents the upper and lower press parts from crushing the material; however, sufficient pressure between 10 psi and 300 psi is applied to provide the pressure necessary to fuse the bonding material together.

Other objects, features and advantages of the invention will appear from the following detailed description of preferred embodiments thereof, reference being made to the accompanying drawing, in which:

BRIEF DESCRIPTION OF THE DRAWING

FIG. 1 is a schematic vertical cross section showing a preferred method and apparatus according to the invention of heating the bonding matrix in the bonding zones by means of a robotically activated, reciprocating, non-contact, focussed, intense, infrared heat source disposed between the two press parts.

FIG. 2 is a schematic prospective view of FIG. 1.

FIG. 3 is a schematic view of the press parts being brought together immediately after the heating cycle with sufficient pressure, typically between 20 psi and 300 psi, to accomplish the bonding.

FIG. 4 shows a schematic view of a preferred manner of applying an extruded monolithic tape of the same matrix resin on the bond line of each interface of the joining sheets or parts.

FIG. 5 is an alternative embodiment of FIG. 4 showing the aplication of a preferred tape directly from an extruder onto the sheet or formed part to be bonded.

FIG. 6 is a schematic vertical cross section taken transverse to the materials to be bonded showing an optional method of abrading the fusion side of the bonding areas prior to heating.

FIG. 7 is a schematic vertical cross section showing a preferred method and apparatus according to the invention illustrating the stepped increase in surface temperature of the bonding zone with each stroke of the focussed infrared heat source.

DETAILED DESCRIPTION OF PREFERRED EMBODIMENTS

Figure 8A:
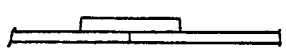
FIGS. 8a through 8e are schematic cross sections showing a sample of the wide variety of joint configurations possible with this invention.
Figure 8B:
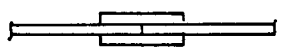
Figure 8C:
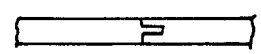
Figure 8D:
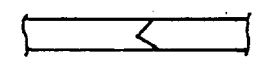
Figure 8E:
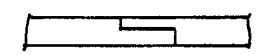

There is shown in FIGS. 1 and 2 an apparatus, 10, according to a preferred embodiment of the present invention for bonding two thermoplastic objects, comprising press platens, 12 and 14, heating means, 22 and 24, mounted on a robotic armature, 26, the respective support and activating means, 32, 34 and 36.

The timing and closure pressure of the press is controlled by the press. Plastic materials to be bonded, 2 and 4, are affixed to the respective press platens by vacuum suction devices (not shown) integral to the platens.

During the heating phase the press remains in its open position. When the heating cycle is complete, the upper and lower press parts are brought quickly and forcefully together into the closed position, as shown in FIG. 3.

The heating sources 22 and 24, fixedly mounted on the robotic arm 26, are movable into or out of a work zone between parts 12 and 14, and are capable of reciprocal and pivotable movement within such zone. Each of the heat sources 22 and 24 are elongated perpendicularly to the cross-sectional plane shown in FIG. 1.

The focal vector of the upper heat source 22 is pointed upward essentially normal to the surface of the first plastic material 2 to be heated. The focal vector of the lower heat source 24 is pointed downward essentially normal to said second plastic material 4 to be heated. The heat sources 22 and 24 consist of commercially available parabolic/elliptical infrared lamps. The displacement, velocity, periodicity, temperature and focal lengths and path of said heat sources are independently controlled.

Prior to the heating of the plastic materials to be bonded, 2 and 4, bonding zones 42 and 44 of said materials to be fused are enriched with resin identical to the resin which forms the matrix of the thermoplastic composite. To accomplish the placing of the resin enrichment pellet or tape 52 which must be preheated prior to the heating of the plastic matrix composite materials, a robotic feeding arm is utilized (not shown). In alternative embodiments, extruded monolithic tape 52 is applied, as shown in FIG. 4, or preformed tape 54 is applied directly by an extruder (FIG. 5). An optional step, as shown in FIG. 6, is the abrading of the surfaces to be joined.

The incremental temperature of the surfaces of the bonding zones increases with each stroke 82 of the reciprocating robotic armature with affixed, focussed heat sources, as shown in FIG. 7. Because plastic has a low coefficient of heat conductivity, during each brief cooling phase of the oscillating focussed heat application the heat is radiated away from the surface to the air rather than to the interior material. Thus the internal temperature remains virtually unaffected while the surface temperature increases to the melt fusion point. It is this alternate "endothermic/exothermic" process which is essential to the present invention. Alternatively, the heat sources can remain stationery and the materials can be reciprocated.

Figure 9A:
FIGS. 9a, 9b and 9c are schematic vertical cross sections showing joint configurations of various multi-dimensional structures.
Figure 9B:
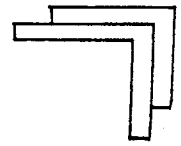
Figure 9C:
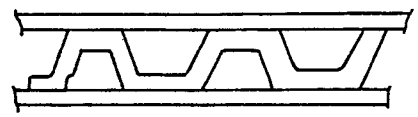

A multitude of joint configurations is possible, as shown in FIGS. 8a through 8e. Three-dimensional preformed plastic objects can be bonded together as shown in FIGS. 9a, 9b and 9c. For example, any size corrugated board may be constructed by bonding flat sheets on either side of a stamp pressed board, as shown in FIG. 9c.

Figure 10:
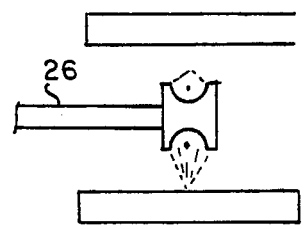
FIG. 10 is a schematic vertical cross-sectional view of the robotic arm with affixed parabolic elliptical infrared reflectors illustrating adjustment of the focal lengths of said heat sources.

The focal lengths of the lamps can be adjusted to coincide with the surface of the material to be heated as shown in FIG. 10. This means that the heat is at maximum intensity at the bonding zone. Indeed, if such intense heat were applied continuously, the plastic would melt or burn.

Figure 11:
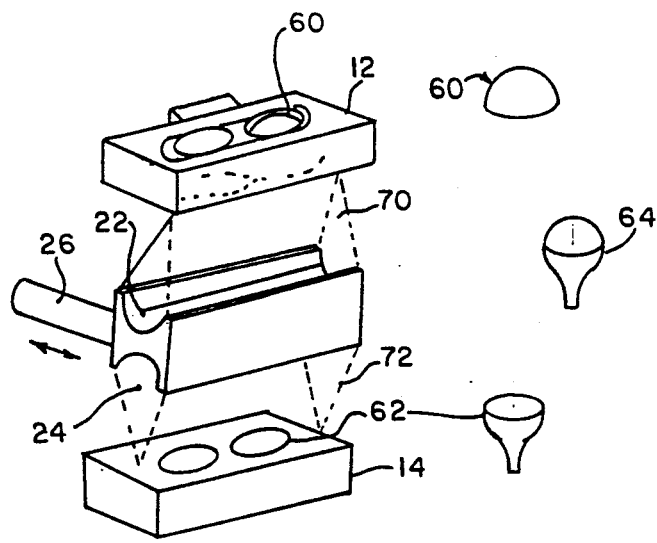
FIG. 11 is a schematic perspective view illustrating the use of this invention for fusing parts of pre-molded elastomeric or composite thermplastics.

In an alternative embodiment this invention can be used to melt-fuse two halves of a preformed bulb as shown in FIG. 11. The two lamps 22 and 24 are mounted back to back on the reciprocating robotic armature 26 while the halves of the preformed elastomeric bulb 60 and 62 are placed on the upper and lower press parts 12 and 14. The focussed heaters 22 and 24 are then reciprocated and when the melt fusion temperature is reached, the robotic arm is removed and the two press parts 12 and 14 brought together. The result is a completely fused bulb 64.

Figure 12:
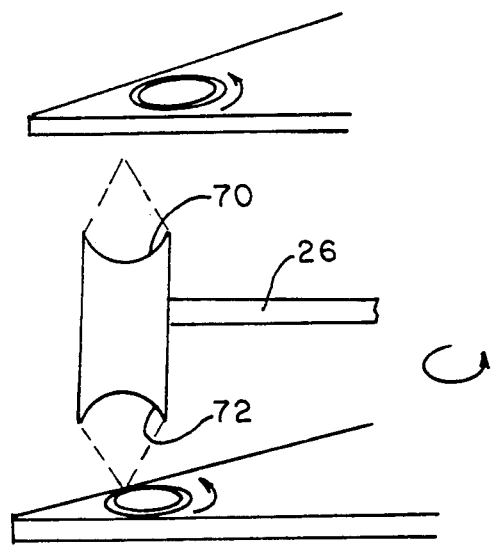
FIGS. 12 and 12a are schematic vertical cross-sectional views of point focus parabolic elliptical infrared heat sources mounted back to back on a robotic arm which can be preprogrammed to trace on a circular or elliptical path.
Figure 12A:

In an alternative embodiment the heat sources are point-focus, parabolic elliptical, infrared reflectors 70, 72 mounted back to back on a robotic armature 26 which rotates in a circle or ellipse thus tracing out a circular or elliptical path on the materials to be bonded, as shown in FIG. 12. This embodiment allows the intermittency of heat application to be accomplished not by a reciprocating back and forth motion, but by a continuous cycle which touches any given point on its path only once in every revolution.

Figure 13A:
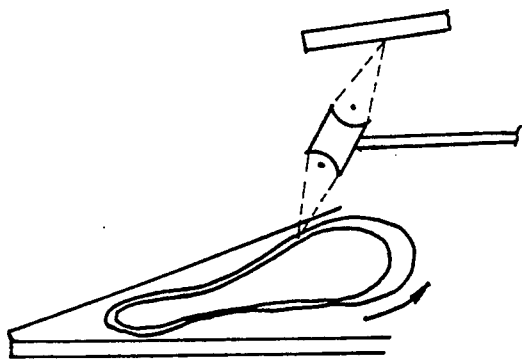
FIGS. 13a, 13b and 13c are alternate embodiments of this invention showing the use of focussed parabolic elliptical infrared spot beams at various angles mounted on a robotic armature which can be programmed to move in any geometric configuration.
Figure 13B:
Figure 13C:
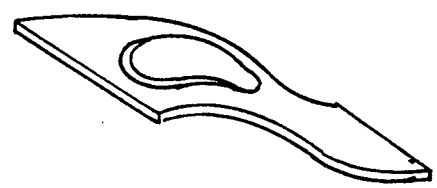

In an additional preferred embodiment the robotic arm 26 with affixed, focussed heat sources 70, 74 can be computer controlled and preprogrammed to trace out any path, thus enabling a variety of geometrically shaped bonds to be accomplished, as shown in FIGS. 13a and 13b. This embodiment gives a flexibility of application to this invention which far exceeds not only the reciprocating armature, but also surpasses any bonding machine in the prior art.

In each embodiment the geometric paths, displacements, velocities, periodicities, temperatures, focal lengths and duration of heating of the heat sources are controlled by electronic circuitry which can be preprogrammed by the operation by means of the control panel, not shown.

Figure 14:
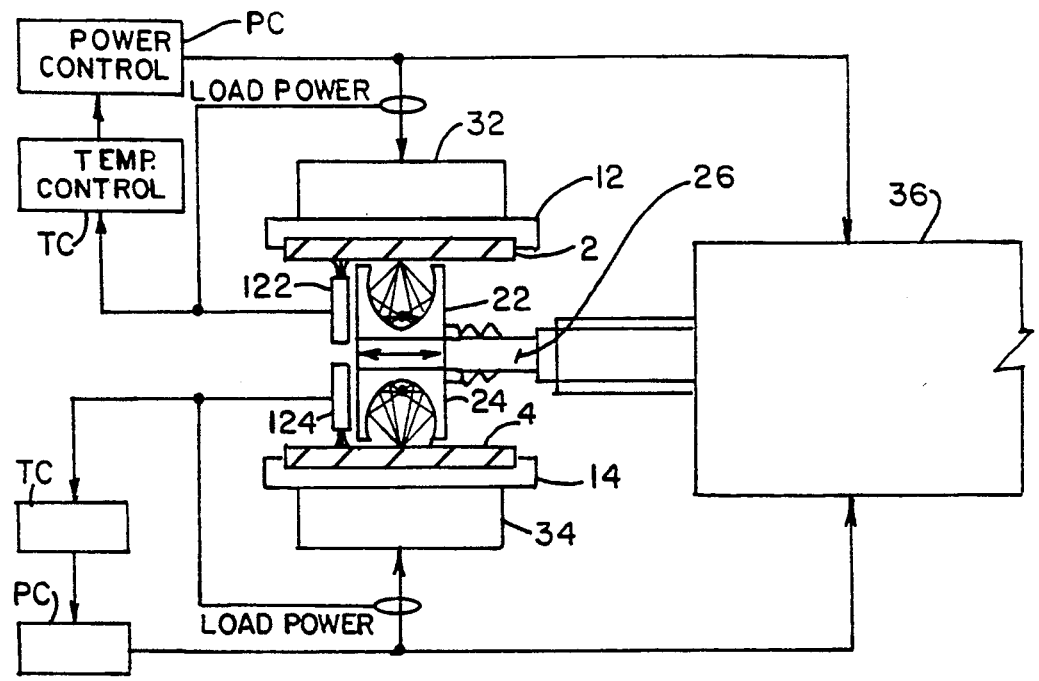
FIGS. 14-15 and 17 are schematic representations of another preferred embodiment at various positions of operation, as described.
Figure 15:
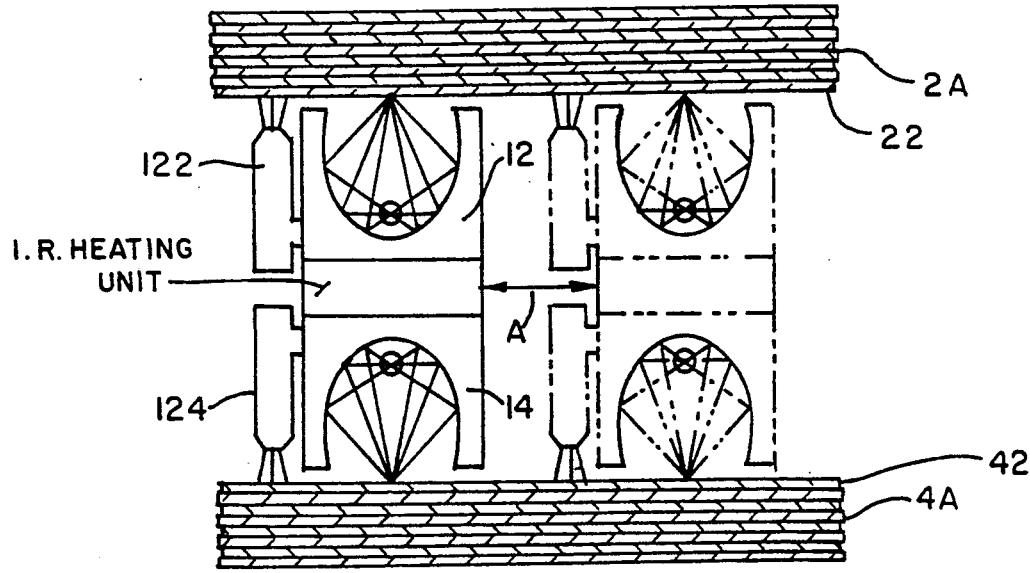

FIGS. 14–15 show a system more or less as in the previous species, with certain enhancements. It includes press platens 12 and 14, mounting parts 2 and 4 to be joined, IR heaters 22 and 24 mounted on a reciprocating arm 26 of a robot machine 36. IR sensing units 122 and 124 are mounted on the IR heaters and have respective temperature control and power control systems, TC and PC (both per se conventional) to control platen positions, reciprocation rate and IR heating temperatures and times. Through this loop control, based on monitoring the temperature of matrix resin on each of the adherends parts 2 and 4, process parameters are tuned to variable conditions of the materials to be joined. The sensing units 122 and 124 continuously read the rising temperatures of the respective interface bond line zones and send signals back to the lamp power controls PC to increase or decrease lamp power, thereby varying lamp intensity and projected radiation until both interface temperature footprints match. When the targeted fusion temperature of each material's surface is reached, the sensors 122, 124 signal the lamps to shut off, the robot arm 26 to withdraw, and the press (32, 34) to cycle.

Figure 16:
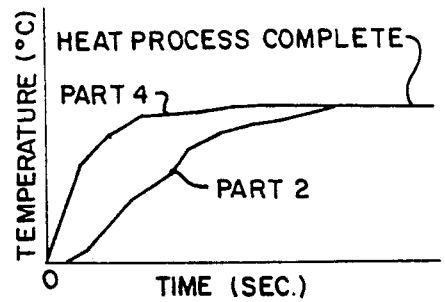
FIG. 16 is a temperature-time trace applicable to operation of the FIGS. 14-15 and 17 apparatus.

The convergence of the lines in the temperature-time trace of FIG. 16 indicates that the upper and lower part interface temperatures have reached reconsolidation temperature, which signals the removal of the robotic arm. Thus, the temperature of the matrix resin is taken on a continuous, noncontact basis and is used to precisely control the overall welding cycle.

The heating wavelength of the lamps is approximately 1.1 microns; the optical sensors have a spectral response of 0.9 to 1.8 microns, which blinds them to visible light. Because the ambient air may be very hot, the sensors may be provided within an air cooling jacket. Alternatively, each sensor can be located outside the heat area and mounted so that its optical lens faces properly positioned right angle mirrors.

Figure 17A:
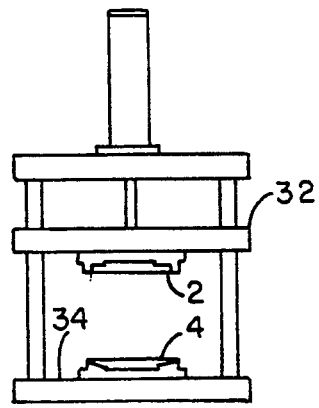
Figure 17B:
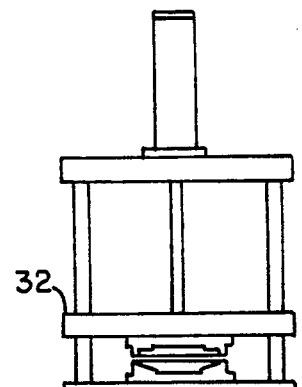
Figure 17C:
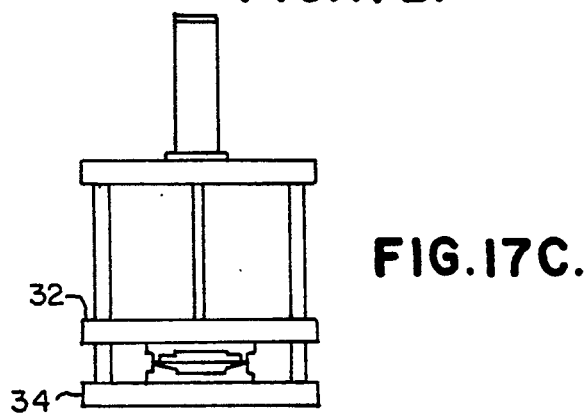

High-temperature thermoplastics and thermoplastic composites tend to cool rapidly. It is preferred therefore, that the press holding the parts have a rapid downstroke of at least one foot per second. To prevent deleterious effects on the joint created by high-pressure impact of the adherends, the press utilizes a double-downstroke function, as shown in FIGS. 17A, 17B, 17C. The press first closes at high speed to a deceleration zone, which is about one half inch from material surface. Then final pressure is applied on a decelerated basis to a die stop.

FIG. 15 shows that parts 2A and 4A comprising layered quasi-isotropic composite panels (the cross-sections of which are exaggerated) may have face layers 22 and 42 which are locally reconsolidated. FIG. 15 also indicates the reciprocating movement (arrow A, dark line and phantom end positions. FIGS. 14–15 also show the parabolic/elliptical focus of the heaters' reflective portion at points on layers 22, 42.

Adaptable to demanding applications in the aerospace/aircraft, automotive, medical, and other market sectors, the process accomodates simple and complex joint configurations, including spot welds, three-dimensional welds, and continuous welds.

This invention has been practiced to achieve outstanding weld strengths with leading advanced engineering thermoplastic materials of significant military and commercial utility uses. These materials include glass-, carbon-, and aramid-fiber reinforced polyetheretherketone (PEEK), polyphenylene sulfide (PPS), polyamideimide polyacrylate (PAI), polyetherimide (PEI), polyacrylate polysulfones, thermoplastic polymides, and liquid crystal polymer (LCP's).

Thermoplastic composites (TPC's) for high-performance applications generally consist of a high-performance thermoplastic matrix resin reinforced with fibers of carbons, graphite, fiberglass, or aramid. Some matrix resins used in TPC's are capable of continuous service at 350° F. to 700° F. They include PEEK, PPS, PEI, PES, PAI, and others. The reinforcements are usually continuous and parallel or laminated in different directions to provide a stress-free, lightweight sheet of unusual strength.

The potential performance and economic benefits of thermoplastics vis-a-vis thermosets in advanced composite applications has been well documented and include lower-cost manufacturing, indefinite prepreg stability, thermoformability of flat sheet stock reprocessing to correct flaws and effect repairs, faster processing cycles, high toughness, and easier quality control. Most of these advantages are due to the fact that unlike thermosets, which are infusible and cannot be softened by heating once cured into shape, thermoplastics become more viscous and flow when subjected to heat. This characteristic makes thermoplastics weldable and facilitates the elimination of adhesives and mechanical fasteners, both of which are less than desirable for high-performance structural applications. See, Benatar, et al., "Methods For Fusion Bonding Thermoplastics Composites", SAMPE Quarterly Vol. 18, No. 1 (October 1986).

There are many problems applying these traditional thermoplastic welding methods to high-performance TPC's such as APC-2 carbon fiber reinforced PEEK or Ryton PPS (available from Phillips Chemical Co.) composites, which are targeted for applications that may require joints that are as strong as the composite itself. TPC laminates comprise up to seventy wt. % of reinforcement. While the introduction of reinforcing fibers into a matrix dramatically upgrades the physical properties of the composite, it often makes welding more difficult since there is less resin available to melt and reconsolidate into a fused joint. Reducing the amount of reinforcement may increase weldability, but only at the expense of composite strength. Also, the advanced thermoplastics used as matrix resins in TPC's must be processed at higher temperatures and have narrower "processing windows" than commodity and general purpose engineering resins. This demands extremely precise control of welding variables—particularly the amount and time of heat to achieve optimum joints. Welding methods such as induction, resistance, ultrasonics, and others that involve preclamping of parts before the introduction of heat do not readily facilitate the direct sensing and measurement of joint melt temperatures without the embedment of thermocouples or sensors in the joint area, a possible negative in many applications. The present invention avoids these difficulties.

The basic process steps used to join high-performance TPC's using focused infrared melt fusion are as follows:

Surface preparation: good wetting of a clean, release agent-free, bond line is essential. Cleaning solutions or plasma treatment is preferable to sanding or abrading the surface, which may remove resin in the two facing adherend plies and loosen the fibers. The high temperatures of the focused IR reciprocating beams (up to 1,200° F.) tend to burn off surface contaminants that may be trapped in asperites of the interface layers.

Positioning of parts into press: two parts are placed into upper and lower holding fixtures in a suitable press. The facing parts are held in open position during the heating stage.

Application of matrix tape (optional): A fiber-free tape of film or resin may be applied to one part surface (the tape is chemically and thermally compatible with the matrix resin of the composite; a resin-rich surface on the composite surfaces may eliminate the need for this step). Another variable that may enhance weld strength is to have the graphite fibers in unidirectional orientation in the first interface layers of each adherend.

Setting of welding parameters: Surface melt temperature goals for each adherend are set on two temperature controllers; the press cycle time, robotic stroke distance, and speed are set.

When the start button is pressed, the robot will move the focused infrared heating lamps into the open press area and commence horizontal reciprocation over the bond lines. During the reciprocation stage, the lamps illuminate immediately on the first stroke and remain on while the optical sensors read the rising surface temperature of each interface. The sensors signal the lamps' power controls to increase or throttle down each lamp's intensity until both interface temperature footprints match. At this point, the sensors signal the robot to remove the lamp fixtures from the press and start the downstroke of the press for completing the operation. The press remains closed until the part cools sufficiently for removal and handling.

The focal vector of the upper heat source is pointed upward; the focal vector of the lower heat source is pointed downward. To limit percolation in the laminates (which can cause interlaminar slippage, separation of fibers, and matrix disruption), the parts to be joined are held as close to the focal vector of the lamp fixtures as possible.

During the reciprocation stage the surface temperature of both adherend interfaces increases with each stroke of the robotic arm. Because the plastic has a relatively low coefficient of heat conductivity, during each brief cooling phase heat radiates away from the surface to the air rather than to interior layers of the composite. Thus, the internal temperature remains virtually unaffected while the surface temperature increases to the melt fusion point.

If the focused infrared heat lamps were stationary over the adherends at these high temperatures the matrix resin would burn immediately. However, the beam is moving and not in any one place long enough to cause burning. During the reciprocation of the lamps the material of each adherend undergoes an accelerated exothermic reaction, that is, a chemical change in which there is a liberation of heat, and an endothermic reaction, that is, a chemical change in which there is an absorption of heat. It is the periodicity of the intensely focused moving beams that creates a faster growth of temperature at just the interfaces of each adherend. This alternate "endothermic/exothermic" process is a unique aspect of focused infrared melt fusion.

Bond lines up to sixteen inches long and four inches wide have been produced and it is possible to produce much larger bond line areas. Bond line length is controlled by the length of the focused infrared lamps, which are commercially available up to one hundred inches long. The reciprocation zone controls bond line width. Very wide bond lines are possible by using multiple lamp fixtures that are placed side-by-side on the robotic arms. For example, four sets of back-to-back forty eight inch focused infrared lamps spaced four inches apart can be used to heat a bond line area twenty inches wide by forty eight inches long.

It will now be apparent to those skilled in the art that other embodiments, improvements, details and uses can be made consistent with the letter and spirit of the foregoing disclosure and within the scope of the patent which is limited only by the following claims, construed in accordance with the patent law, including the doctrine of equivalents.

What is claimed is:

1. An apparatus for bonding two thermoplastic objects comprising:

first means for carrying a first thermoplastic object to be bonded along a predetermined first bonding area;

second means for carrying a second thermoplastic object to be bonded to such first thermoplastic object along a predetermined second bonding area;

heating means for producing a first focused beam of infrared heat impinging upon such first object within substantially only such first bonding area and for producing a second focused beam of infrared heat impinging upon such second object within substantially only such second bonding area;

means for effecting movement of said first and second focused beams relative to and impinging within such first and second bonding areas, respectively, to repeatedly heat such objects within such bonding areas to a melt fusion point; and means effecting relative movement of said first means and said second means toward one another for joining such first and second objects along such predetermined bonding areas.

2. The apparatus as specified in claim 1 wherein:

said means for effecting relative movement of said first and second focused beams reciprocates said beams with respect to such areas.

3. The apparatus as specified in claim 1 wherein:

said means for effecting relative movement of said first and second focused beams causes said beams to move along an endless path.

* * * * *